(12) United States Patent
Meng (10) Patent No.: US 11,906,704 B2
(45) Date of Patent: Feb. 20, 2024

(54) CAMERA OPTICAL LENS

(71) Applicant: Raytech Optical (Changzhou) Co., Ltd, Changzhou (CN)

(72) Inventor: Jie Meng, Shenzhen (CN)

(73) Assignee: Raytech Optical (Changzhou) Co., Ltd, Changzhou (CN)

(*) Notice: Subject to any disclaimer, the term of this patent is extended or adjusted under 35 U.S.C. 154(b) by 545 days.

(21) Appl. No.: 17/136,038

(22) Filed: Dec. 29, 2020

(65) Prior Publication Data
US 2022/0091384 A1  Mar. 24, 2022

(30) Foreign Application Priority Data

Sep. 18, 2020 (CN) .......................... 202010983230.X (51) Int. Cl.
*G02B 9/62* (2006.01)
*G02B 13/06* (2006.01)
*G02B 13/00* (2006.01)

(52) U.S. Cl.
CPC ........... *G02B 13/0045* (2013.01); *G02B 9/62* (2013.01)

(58) Field of Classification Search
CPC ...... G02B 13/0045; G02B 9/62; G02B 13/06; G02B 15/1465
See application file for complete search history.

(56) References Cited

U.S. PATENT DOCUMENTS

2014/0368931 A1* 12/2014 Noda ..................... G02B 9/62
359/740

FOREIGN PATENT DOCUMENTS

| CN | 107065125 A | * | 8/2017 | ......... G02B 13/0045 |
| CN | 209327669 B1 | | 8/2019 | |
| CN | 209327669 U | * | 8/2019 | |
| CN | 211123446 U | * | 7/2020 | |

OTHER PUBLICATIONS

1st Office Action dated Nov. 19, 2020 by SIPO in related Chinese Patent Application No. 202010983230.X (5 Pages).

* cited by examiner

*Primary Examiner* — Mustak Choudhury
*Assistant Examiner* — K Muhammad
(74) *Attorney, Agent, or Firm* — W&G Law Group (57) ABSTRACT

Disclosed is a camera optical lens, comprising, from an object side to an image side in sequence: a first lens having a negative refractive power; a second lens having a positive refractive power; a third lens having a positive refractive power; a fourth lens having a negative refractive power; a fifth lens having a positive refractive power; and a sixth lens having a negative refractive power; wherein, the camera optical lens satisfies: $-4.50 \leq f1/f \leq -2.20$; $2.00 \leq f2/f \leq 5.50$; $-20.00 \leq (R3+R4)/(R3-R4) \leq -2.50$; and $3.00 \leq d9/d10 \leq 10.00$; where, f denotes a focus length of camera optical lens; f1 and f2 denote focus lengths of first and second lens respectively; d9 denotes an on-axis thickness of fifth lens; d10 denotes an on-axis distance from an image side surface of fifth lens to an object side surface of sixth lens; R3 and R4 denote central curvature radii of an object side surface and an object side surface of second lens respectively.

9 Claims, 9 Drawing Sheets

CAMERA OPTICAL LENS

TECHNICAL FIELD

The present disclosure generally relates to optical lens, in particular to a camera optical lens suitable for handheld terminals, such as smart phones and digital cameras, and imaging devices, such as monitors and PC lens.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor). As the progress of the semiconductor manufacturing technology makes the pixel size of the photosensitive devices become smaller, and with the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a three-piece or four-piece lens structure. While, with the development of technology and the increase of the diverse demands of users, and as the pixel area of photosensitive devices is becoming smaller and smaller and the requirement of the system on the imaging quality is improving constantly, the six-piece lens structure gradually appears in lens design. The common six-piece lens has good optical performance, but the design on focal power, lens spacing and lens shape is not reasonable, thus the lens structure could not meet the requirements for having a wide angle and ultra-thinness while having good optical performance.

Therefore, it is necessary to provide a camera lens which meets the requirements for having a wide angle and ultra-thinness while having good optical performance.

SUMMARY

Some embodiments of the present disclosure provides camera optical lens, comprising six lenses in total, the six lenses are, from an object side to an image side in sequence: a first lens having a negative refractive power; a second lens having a positive refractive power; a third lens having a positive refractive power; a fourth lens having a negative refractive power; a fifth lens having a positive refractive power; and a sixth lens having a negative refractive power; wherein, the camera optical lens satisfies the following conditions: $-4.50 \leq f1/f \leq -2.20$; $2.00 \leq f2/f \leq 5.50$; $-20.00 \leq (R3+R4)/(R3-R4) \leq -2.50$; and $3.00 \leq d9/d10 \leq 10.00$; where, f denotes a focus length of the camera optical lens; f1 denotes a focus length of the first lens; f2 denotes a focus length of the second lens; d9 denotes an on-axis thickness of the fifth lens; d10 denotes an on-axis distance from an image side surface of the fifth lens to an object side surface of the sixth lens; R3 denotes a central curvature radius of an object side surface of the second lens; and R4 denotes a central curvature radius of an image side surface of the second lens.

As an improvement, the camera optical lens further satisfies the following conditions: $1.50 \leq (R7+R8)/(R7-R8) \leq 10.00$; where, R7 denotes a central curvature radius of an object side surface of the fourth lens; and R8 denotes a central curvature radius of an image side surface of the fourth lens.

As an improvement, the camera optical lens satisfies the following conditions: $-5.66 \leq (R1+R2)/(R1-R2) \leq -0.19$; and $0.03 \leq d1/TTL \leq 0.14$; where, R1 denotes a central curvature radius of an object side surface of the first lens; R2 denotes a central curvature radius of an image side surface of the first lens; d1 denotes an on-axis thickness of the first lens; and TTL denotes a total optical length from an object side surface of the first lens to an image surface of the camera optical lens along an optical axis.

As an improvement, the camera optical lens further satisfies the following conditions: $0.02 \leq d3/TTL \leq 0.08$; where, d3 denotes an on-axis thickness of the second lens; and TTL denotes a total optical length from an object side surface of the first lens to an image surface of the camera optical lens along an optical axis.

As an improvement, the camera optical lens satisfies the following conditions: $0.39 \leq f3/f \leq 1.61$; $0.17 \leq (R5+R6)/(R5-R6) \leq 0.98$; and $0.06 \leq d5/TTL \leq 0.21$; where, f3 denotes a focus length of the third lens; R5 denotes a central curvature radius of an object side surface of the third lens; R6 denotes a central curvature radius of an image side surface of the third lens; d5 denotes an on-axis thickness of the third lens; and TTL denotes a total optical length from an object side surface of the first lens to an image surface of the camera optical lens along an optical axis.

As an improvement, the camera optical lens satisfies the following conditions: $-54.92 \leq f4/f \leq -1.29$; and $0.02 \leq d7/TTL \leq 0.09$; where, f4 denotes a focus length of the fourth lens; d7 denotes an on-axis thickness of the fourth lens; and TTL denotes a total optical length from an object side surface of the first lens to an image surface of the camera optical lens along an optical axis.

As an improvement, the camera optical lens satisfies the following conditions: $0.27 \leq f5/f \leq 1.19$; $0.97 \leq (R9+R10)/(R9-R10) \leq 3.87$; and $0.06 \leq d9/TTL \leq 0.22$; where, f5 denotes a focus length of the fifth lens; R9 denotes a central curvature radius of an object side surface of the fifth lens; R10 denotes a central curvature radius of the image side surface of the fifth lens; and TTL denotes a total optical length from an object side surface of the first lens to an image surface of the camera optical lens along an optical axis.

As an improvement, the camera optical lens satisfies the following conditions: $-1.38 \leq f6/f \leq -0.31$; $0.55 \leq (R11+R12)/(R11-R12) \leq 3.19$; and $0.03 \leq d11/TTL \leq 0.13$; where, f6 denotes a focus length of the sixth lens; R11 denotes a central curvature radius of the object side surface of the sixth lens; R12 denotes a central curvature radius of an image side surface of the sixth lens; d11 denotes an on-axis thickness of the sixth lens; and TTL denotes a total optical length from an object side surface of the first lens to an image surface of the camera optical lens along an optical axis.

As an improvement, the camera optical lens satisfies the following conditions: $TTL/IH \leq 1.66$; where, IH denotes an image height of the camera optical lens; and TTL denotes a total optical length from an object side surface of the first lens to an image surface of the camera optical lens along an optical axis.

As an improvement, the camera optical lens satisfies the following conditions: $FOV \geq 103°$; where, FOV denotes a field of view of the camera optical lens.

BRIEF DESCRIPTION OF THE DRAWINGS

In order to explain the technical solutions in the embodiments of the present disclosure more clearly, the drawings to be used for describing the embodiments will be described briefly in the following. Apparently, the drawings in the following are only for facilitating the description of the embodiments, for those skilled in the art, other drawings may be obtained from the accompanying drawings without creative work.

DETAILED DESCRIPTION OF THE EXEMPLARY EMBODIMENTS

In the following, the present application will be further described in connection with the drawings and embodiments.

To make the objects, technical solutions, and advantages of the present disclosure clearer, the embodiments of the present disclosure are described in detail with reference to the accompanying drawings as follows. A person of ordinary skill in the related art would understand that, in the embodiments of the present disclosure, many technical details are provided to make readers better understand this application. However, the technical solutions sought to be protected by this application could be implemented, even without these technical details and any changes and modifications based on the following embodiments.

Embodiment 1

Figure 1:
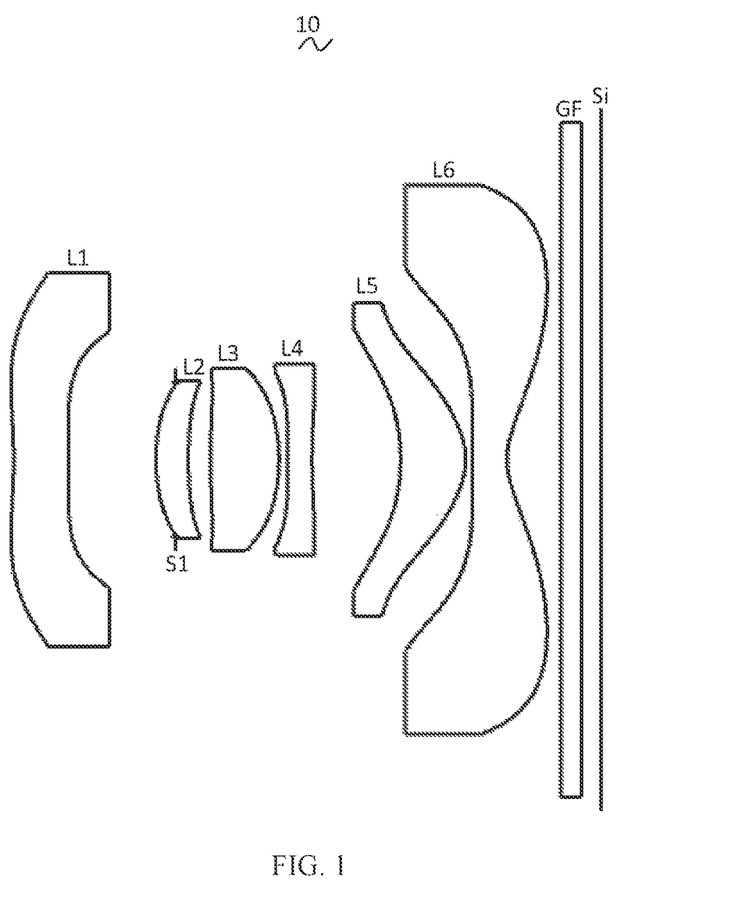
FIG. 1 is a schematic diagram of a structure of a camera optical lens in accordance with Embodiment 1 of the present disclosure.

As shown in the accompanying drawings, the present disclosure provides a camera optical lens 10. FIG. 1 shows the camera optical lens 10 of Embodiment 1 of the present disclosure. In FIG. 1, the left side shows an object side, and the right side shows an image side. The camera optical lens 10 comprises six lenses in total. Specifically, the camera optical lens 10 comprises in sequence from an object side to an image side: a first lens L1, an aperture S1, a second lens L2, a third lens L3, a fourth lens L4, a fifth lens L5 and a six lens L6. An optical element such as an optical filter GF may be arranged between the six lens L6 and an image surface S1.

In this embodiment, the first lens L1, the second lens L2, the third lens L3, the fourth lens L4, the fifth lens L5 and the six lens L6 are all made of plastic material. In some embodiments, the lenses may also be made of other materials.

In this embodiment, the first lens L1 has a negative refractive power, the second lens L2 has a positive refractive power, the third lens L3 has a positive refractive power, the fourth lens L4 has a negative refractive power, the fifth lens has a positive refractive power and the sixth lens L6 has a negative refractive power.

In this embodiment, a focal length of the camera optical lens 10 is defined as f, a focal length of the first lens L1 is defined as f1, a focal length of the second lens L2 is defined as f2, an on-axis thickness of the fifth lens L5 is defined as d9, an on-axis distance from an image side surface of the fifth lens L5 to an object side surface of the sixth lens L6 is defined as d10, a central curvature radius of an object side surface of the second lens L2 is defined as R3, and a central curvature radius of an image side surface of the second lens L2 is defined as R4. The camera optical lens 10 further satisfies the following conditions:

$$-4.50 \leq f1/f \leq -2.20; \tag{1}$$

$$2.00 \leq f2/f \leq 5.50; \tag{2}$$

$$-20.00 \leq (R3+R4)/(R3-R4) \leq -2.50; \tag{3}$$

$$3.00 d9/d10 \leq 10.00 \tag{4}$$

Herein, the above condition (1) specifies a ratio between the focal length f1 of the first lens L1 and the focal length f of the camera optical lens 10, which can effectively balance spherical abbreviation and curve field of the system.

The above condition (2) specifies a ratio between the focal length f2 of the second lens L2 and the focal length f of the camera optical lens 10. The whole camera optical lens 10 has better imaging quality and lower sensitivity by reasonably distributing the focal power.

The above condition (3) specifies a shape of the second lens L2. When the above condition is satisfied, the degree of light deflection when passing through the lens is flattened, and thus the aberration is effectively reduced.

The above condition (4) specifies a ratio between the on-axis thickness d9 of the fifth lens L5 and the on-axis distance d10 from the image side surface of the fifth lens L5 to the object side surface of the sixth lens L6. When the above condition is satisfied, it is beneficial for reducing the total optical length, and thus realizing ultra-thinness. Preferably, the camera optical lens 10 further satisfies a condition of 3.05≤d9/d10≤9.48.

A central curvature radius of an object side surface of the fourth lens L4 is defined as R7, and a central curvature radius of an image side surface of the fourth lens L4 is defined as R8. The camera optical lens 10 should satisfies a condition of 1.50≤(R7+R8)/(R7−R8)≤10.00, which specifies a shape of the fourth lens L4. With the development towards wide-angle lenses, it is beneficial for correcting aberration of the off-axis picture angle when the above condition is satisfied.

In this embodiment, an object side surface of the first lens L1 is concave in a paraxial region, and an image side surface of the first lens L1 is convex in the paraxial region.

A central curvature radius of the object side surface of the first lens L1 is defined as R1, and a central curvature radius of the image side surface of the first lens L1 is defined as R2. The camera optical lens 10 satisfies a condition of $-5.66 \leq (R1+R2)/(R1-R2) \leq -0.19$, thus the shape of the first lens is reasonably controlled, so that the first lens may effectively correct system spherical aberration. Preferably, the camera optical lens 10 further satisfies a condition of $-3.45 \leq (R1+R2)/(R1-R2) \leq -0.23$.

An on-axis thickness of the first lens L1 is d1, and a total optical length from an object side surface of the first lens to an image surface of the camera optical lens along an optical axis is defined as TTL. The camera optical lens 10 should satisfies a condition of $0.03 \leq d1/TTL \leq 0.14$, thus the shape of the first lens is reasonably controlled, which is beneficial for realization of ultra-thin lenses. Preferably, the camera optical lens 10 further satisfies a condition of $0.05 \leq d1/TTL \leq 0.11$.

In this embodiment, the object side surface of the second lens L2 is convex in a paraxial region, and the image side surface of the second lens L2 is concave in the paraxial region.

An on-axis thickness of the second lens L2 is defined as d3, and the total optical length from an object side surface of the first lens to an image surface of the camera optical lens along an optical axis is defined as TTL. The camera optical lens 10 satisfies a condition of $0.02 \leq d3/TTL \leq 0.08$. When the above condition is satisfied, it is beneficial for realization of ultra-thin lenses. Preferably, the camera optical lens 10 further satisfies a condition of $0.03 \leq d3/TTL \leq 0.07$.

In this embodiment, an object side surface of the third lens L3 is convex in a paraxial region, and an image side surface of the third lens L3 is convex in the paraxial region.

A focal length of the third lens L3 is defined as f3 and a focal length of the camera optical lens 10 is defined as f. The camera optical lens 10 satisfies a condition of $0.39 \leq f3/f \leq 1.61$. By reasonably distributing the focal power, the system has good imaging quality and lower sensitivity. Preferably, the camera optical lens 10 further satisfies a condition of $0.63 \leq f3/f \leq 1.28$.

A central curvature radius of an object side surface of the third lens L3 is defined as R5, and a central curvature radius of an image side surface of the third lens L3 is defined as R6. The camera optical lens 10 satisfies a condition of $0.17 \leq (R5+R6)/(R5-R6) \leq 0.98$, which specifies a shape of the third lens L3. When the above condition is satisfied, the degree of light deflection when passing through the lens may be reduced, and thus the aberration is effectively reduced. Preferably, the camera optical lens 10 further satisfies a condition of $0.27 \leq (R5+R6)/(R5-R6) \leq 0.79$.

An on-axis thickness of the third lens L3 is defined as d5, and the total optical length from an object side surface of the first lens to an image surface of the camera optical lens along an optical axis is defined as TTL. The camera optical lens 10 satisfies a condition of $0.06 \leq d5/TTL \leq 0.21$. When the above condition is satisfied, it is beneficial for realization of ultra-thin lenses. Preferably, the camera optical lens 10 further satisfies a condition of $0.09 \leq d5/TTL \leq 0.17$.

In this embodiment, the object side surface of the fourth lens L4 is convex in a paraxial region and the image side surface of the fourth lens L4 is concave in the paraxial region.

A focal length of the fourth lens L4 is defined as f4, and the focal length of the camera optical lens 10 is defined as f. The camera optical lens 10 satisfies a condition of $-54.92 \leq f4/f \leq -1.29$, which specifies a ratio between the focal length f4 of the fourth lens L4 and the focal length f of the camera optical lens 10. When the above condition is satisfied, it is beneficial for improving optical system performance. Preferably, the camera optical lens 10 further satisfies a condition of $-34.32 \leq f4/f \leq -1.62$.

A central on-axis thickness of the fourth lens L4 satisfies is defined as d7, and the total optical length from an object side surface of the first lens to an image surface of the camera optical lens along an optical axis is defined as TTL. The camera optical lens 10 satisfies a condition of $0.02 \leq d7/TTL \leq 0.09$. When the above condition is satisfied, it is beneficial for the realization of ultra-thin lenses. Preferably, the camera optical lens 10 further satisfies a condition of $0.03 \leq d7/TTL \leq 0.07$.

In this embodiment, an object side surface of the fifth lens L5 is concave in a paraxial region, and an image side surface of the fifth lens L5 is convex in the paraxial region.

A focal length of the fifth lens L5 is defined as f5, and the focal length of the camera optical lens 10 is defined as f. The camera optical lens 10 satisfies a condition of $0.27 \leq f5/f \leq 1.19$. The limitation on the fifth lens L5 may effectively reduce the light angle of the camera optical lens, and reduce tolerance sensitivity. Preferably, the camera optical lens 10 further satisfies a condition of $0.44 \leq f5/f \leq 0.95$.

A central curvature radius of an object side surface of the fifth lens L5 is defined as R9, and a central curvature radius of the image side surface of the fifth lens L5 is defined as R10. The camera optical lens 10 satisfies a condition of $0.97 \leq (R9+R10)/(R9-R10) \leq 3.87$, which specifies the shape of the fifth lens L5. When the above condition is satisfied, it is beneficial for solving a problem like chromatic aberration of the off-axis picture angle. Preferably, the camera optical lens 10 further satisfies a condition of $1.56 \leq (R9+R10)/(R9-R10) \leq 3.09$.

An on-axis thickness of the fifth lens L5 is defined as d9, and the total optical length from an object side surface of the first lens to an image surface of the camera optical lens along an optical axis is defined as TTL. The camera optical lens 10 satisfies a condition of $0.06 \leq d9/TTL \leq 0.22$. It is beneficial for realization of ultra-thin lenses when the above condition is satisfied. Preferably, the camera optical lens 10 further satisfies a condition of $0.09 \leq d9/TTL \leq 0.18$.

In this embodiment, the object side surface of the sixth lens L6 is convex in a paraxial region, and an image side surface of the sixth lens L6 is concave in the paraxial region.

A focal length of the sixth lens L6 is defined as f6, and the focal length of the camera optical lens 10 is defined as f. The camera optical lens 10 satisfies a condition of $-1.38 \leq f6/f \leq -0.31$. The camera optical lens 10 has better imaging quality and lower sensitivity by reasonably distributing the focal power. Preferably, the camera optical lens 10 further satisfies a condition of $-0.86 \leq f6/f \leq -0.38$.

A central curvature radius of the object side surface of the sixth lens L6 is defined as R11, and a central curvature radius of the image side surface of the sixth lens L6 is defined as R12. The camera optical lens 10 satisfies a condition of $0.55 \leq (R11+R12)/(R11-R12) \leq 3.19$, which specifies the shape of the sixth lens L6. With the development towards ultra-thin and wide-angle lenses, it is beneficial for solving a problem like chromatic aberration of the off-axis picture angle, when the above condition is satisfied. Preferably, the camera optical lens 10 further satisfies a condition of $0.89 \leq (R11+R12)/(R11-R12) \leq 2.55$.

An on-axis thickness of the sixth lens L6 is defined as d11, and the total optical length from an object side surface of the first lens to an image surface of the camera optical lens along an optical axis is defined as TTL. The camera optical lens 10 satisfies a condition of $0.03 \leq d11/TTL \leq 0.13$. It is beneficial for realization of ultra-thin lenses when the above condition is satisfied. Preferably, the camera optical lens 10 further satisfies a condition of $0.04 \leq d11/TTL \leq 0.11$.

It shall be understood that in other embodiments, the object side surfaces and the image side surfaces of the first lens L1, the second lens L2, the third lens L3, the fourth lens L4, the fifth lens L5 and the six lens L6 may be provided as having convex or concave shapes other than those described above.

In this embodiment, a field of view FOV of the camera optical lens 10 is greater than or equal to 103°, thus realizing a wide angle.

In this embodiment, the total optical length of the camera optical lens is defined as TTL, and an image height of the camera optical lens 10 is defined as IH. The camera optical lens 10 satisfies a condition of $TTL/IH \leq 1.66$, which is beneficial for realization of ultra-thin lenses.

When the focal length of the camera optical lens 10, and the focal lengths and the central curvature radii of respective lenses satisfy the above conditions, the camera optical lens 10 has a wide angle and an ultra-thinness while having good optical performance; and with such properties, the camera optical lens 10 is particularly suitable for a mobile camera lens assembly and a WEB camera lens that have CCD, CMOS and other imaging elements with high pixels.

In the following, an example will be taken to describe the camera optical lens 10 of the present disclosure. The symbols recorded in each example are as follows. The unit of the focal length, the on-axis distance, the curvature radius, the on-axis thickness, an inflexion point position and an arrest point position is mm.

TTL: Optical length (the total optical length from the object side surface of the first lens L1 to the image plane Si) in mm.

Aperture value FNO: ratio of an effective focal length of the camera optical lens 10 to an entrance pupil diameter.

In addition, inflexion points and/or arrest points may be arranged on the object side surface and/or image side surface of the lens, so as to satisfy the demand for high quality imaging. The description below may be referred to for specific implementations.

The design data of the camera optical lens 10 in FIG. 1 is shown as follows.

The design data of the camera optical lens 10 in Embodiment 1 of the present disclosure is shown in Tables 1 and 2.

TABLE 1

| | R | d | | nd | | vd |
|---|---|---|---|---|---|---|
| S1 | ∞ | d0= | −1.644 | | | |
| R1 | −4.951 | d1= | 0.554 | nd1 | 1.5661 | v1 | 37.71 |
| R2 | −15.286 | d2= | 0.891 | | | |
| R3 | 1.912 | d3= | 0.331 | nd2 | 1.5346 | v2 | 55.69 |
| R4 | 4.443 | d4= | 0.225 | | | |
| R5 | 9.722 | d5= | 0.695 | nd3 | 1.5444 | v3 | 55.82 |
| R6 | −2.016 | d6= | 0.085 | | | |
| R7 | 24.589 | d7= | 0.250 | nd4 | 1.6700 | v4 | 19.39 |
| R8 | 4.934 | d8= | 0.900 | | | |
| R9 | −2.108 | d9= | 0.662 | nd5 | 1.5346 | v5 | 55.69 |
| R10 | −0.677 | d10= | 0.067 | | | |
| R11 | 14.181 | d11= | 0.354 | nd6 | 1.5661 | v6 | 37.71 |
| R12 | 0.716 | d12= | 0.550 | | | |
| R13 | ∞ | d13= | 0.210 | ndg | 1.5168 | vg | 64.17 |
| R14 | ∞ | d14= | 0.199 | | | |

In the table, meanings of various symbols will be described as follows.

S1: Aperture;
R: curvature radius at a center of an optical surface;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of the object side surface of the sixth lens L6;
R12: central curvature radius of the image side surface of the sixth lens L6;
R13: central curvature radius of an object side surface of the optical filter GF;
R14: central curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface of the optical filter GF to the image plane S1;
nd: refractive index of d line;
nd1: refractive index of d line of the first lens L1;
nd2: refractive index of d line of the second lens L2;
nd3: refractive index of d line of the third lens L3;

nd4: refractive index of d line of the fourth lens L4;
nd5: refractive index of d line of the fifth lens L5;
nd6: refractive index of d line of the sixth lens L6;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF.

Table 2 shows aspherical surface data of the camera optical lens 10 in Embodiment 1 of the present disclosure.

surface of the second lens L2, P3R1 and P3R2 represent respectively the object side surface and image side surface of the third lens L3, P4R1 and P4R2 represent respectively the object side surface and image side surface of the fourth lens L4, P5R1 and P5R2 represent respectively the object side surface and image side surface of the fifth lens L5; and P6R1 and P6R2 represent respectively the object side surface and image side surface of the sixth lens L6. Data in the column named "inflexion point position" refers to vertical distances from the inflexion points arranged on each lens surface to the optic axis of the camera optical lens 10. The data in the column named "arrest point position" refers to the vertical distances from the arrest points arranged on each lens surface to the optic axis of the camera optical lens 10.

TABLE 2

| | Conic coefficient | Aspherical surface coefficients | | | | |
|---|---|---|---|---|---|---|
| | k | A4 | A6 | A8 | A10 | A12 |
| R1 | 2.1127E+00 | 1.1228E−01 | −3.7109E−02 | 1.4955E−02 | −4.7979E−03 | 1.1781E−03 |
| R2 | 5.7206E+01 | 1.6311E−01 | −3.1897E−02 | 2.1465E−02 | −3.6603E−03 | 2.7388E−03 |
| R3 | 1.0121E+00 | 6.9851E−02 | −2.6522E−02 | 1.3315E−01 | −1.2673E−01 | −2.7958E−01 |
| R4 | 2.2686E+01 | 4.7418E−02 | 3.6676E−02 | −2.9137E−01 | 1.4505E+00 | −3.5551E+00 |
| R5 | 9.7454E+01 | −2.4104E−02 | −3.7267E−02 | −1.2765E−01 | 3.2444E−01 | −5.9418E−01 |
| R6 | 1.6777E+00 | −2.0686E−01 | 4.7206E−01 | −1.0761E+00 | 1.5677E+00 | −1.3599E+00 |
| R7 | 7.6949E+01 | −3.3587E−01 | 4.2734E−01 | −8.4069E−01 | 8.7173E−01 | −8.9404E−01 |
| R8 | −7.3062E+01 | −6.7871E−02 | 3.3163E−02 | −8.8733E−02 | 1.6675E−01 | −1.6641E−01 |
| R9 | −1.2588E+00 | −1.2600E−01 | 8.2327E−02 | −5.5683E−02 | 1.2774E−01 | −1.2588E−01 |
| R10 | −4.1465E+00 | −2.6247E−01 | 2.8898E−01 | −3.5280E−01 | 3.7269E−01 | −2.4031E−01 |
| R11 | 3.3132E+01 | −1.0651E−01 | −1.1831E−02 | 4.0920E−02 | −1.8889E−02 | −2.5809E−03 |
| R12 | −5.7706E+00 | −5.3528E−02 | 7.1597E−03 | 6.9688E−03 | −5.1242E−03 | 1.6605E−03 |

| | Conic coefficient | Aspherical surface coefficients | | | |
|---|---|---|---|---|---|
| | k | A14 | A16 | A18 | A20 |
| R1 | 2.1127E+00 | −1.9867E−04 | 1.4653E−05 | 0.0000E+00 | 0.0000E+00 |
| R2 | 5.7206E+01 | 5.3298E−04 | −9.6016E−04 | 0.0000E+00 | 0.0000E+00 |
| R3 | 1.0121E+00 | 8.1962E−01 | −5.8125E−01 | 0.0000E+00 | 0.0000E+00 |
| R4 | 2.2686E+01 | 4.5373E+00 | −2.3279E+00 | 0.0000E+00 | 0.0000E+00 |
| R5 | 9.7454E+01 | 4.6996E−01 | −5.7148E−02 | 0.0000E+00 | 0.0000E+00 |
| R6 | 1.6777E+00 | 6.1153E−01 | −9.7321E−02 | 0.0000E+00 | 0.0000E+00 |
| R7 | 7.6949E+01 | −9.6024E−01 | 1.0027E+00 | −3.6227E−01 | 0.0000E+00 |
| R8 | −7.3062E+01 | 1.1305E−01 | −4.4198E−02 | 6.8069E−03 | 0.0000E+00 |
| R9 | −1.2588E+00 | 5.1236E−02 | −6.0187E−03 | −1.2552E−03 | 2.7855E−04 |
| R10 | −4.1465E+00 | 9.3404E−02 | −2.1858E−02 | 2.8645E−03 | −1.6225E−04 |
| R11 | 3.3132E+01 | 4.7254E−03 | −1.5322E−03 | 2.1249E−04 | −1.1150E−05 |
| R12 | −5.7706E+00 | −3.0984E−04 | 3.4181E−05 | −2.0780E−06 | 5.3672E−08 |

Among them, K is a conic index, A4, A6, A8, A10, A12, A14, A16, A18 and A20 are aspheric surface indexes.

$$y=(x^2/R)/\{1+[1-(k+1)(x^2/R^2)]^{1/2}\}A4x^4+A6x^6+A8x^8+A10x^{10}+A12x^{12}+A14x^{14}+A16x^{16}+A18x^{18}+A20x^{20}$$

Where, x denotes a vertical distance from a point on an aspheric curve to the optical axis, and y denotes a depth of the aspheric surface (a vertical distance from a point on the aspheric surface having a distance x to the optical lens, to a tangent plane that tangents to a vertex on the optical axis of the aspheric surface).

For convenience, an aspheric surface of each lens surface uses the aspheric surfaces shown in the above formula (5). However, the present disclosure is not limited to the aspherical polynomials form shown in the formula (5).

Table 3 and table 4 show the inflexion points and the arrest point design data of the camera optical lens 10 lens in Embodiment 1 of the present disclosure. Where, P1R1 and P1R2 represent respectively the object side surface and image side surface of the first lens L1, P2R1 and P2R2 represent respectively the object side surface and image side

TABLE 3

| | Number of inflexion points | Inflexion point position 1 | Inflexion point position 2 |
|---|---|---|---|
| P1R1 | 2 | 0.425 | 1.805 |
| P1R2 | 1 | 0.195 | / |
| P2R1 | 0 | / | / |
| P2R2 | 0 | / | / |
| P3R1 | 2 | 0.465 | 0.825 |
| P3R2 | 0 | / | / |
| P4R1 | 1 | 0.105 | / |
| P4R2 | 2 | 0.405 | 0.925 |
| P5R1 | 1 | 1.125 | / |
| P5R2 | 1 | 0.985 | / |
| P6R1 | 2 | 0.245 | 1.665 |
| P6R2 | 1 | 0.575 | / |

TABLE 4

| | Number of arrest points | Arrest point position 1 |
|---|---|---|
| P1R1 | 1 | 0.775 |
| P1R2 | 1 | 0.325 |
| P2R1 | 0 | / |
| P2R2 | 0 | / |
| P3R1 | 1 | 0.695 |
| P3R2 | 0 | / |
| P4R1 | 1 | 0.175 |
| P4R2 | 1 | 0.755 |
| P5R1 | 0 | / |
| P5R2 | 0 | / |
| P6R1 | 1 | 0.405 |
| P6R2 | 1 | 1.765 |

The following Table 17 shows various values of Embodiments 1, 2, 3, 4 and values corresponding to parameters which are already specified in the above conditions.

As shown in Table 17, Embodiment 1 satisfies the various conditions.

Figure 2:
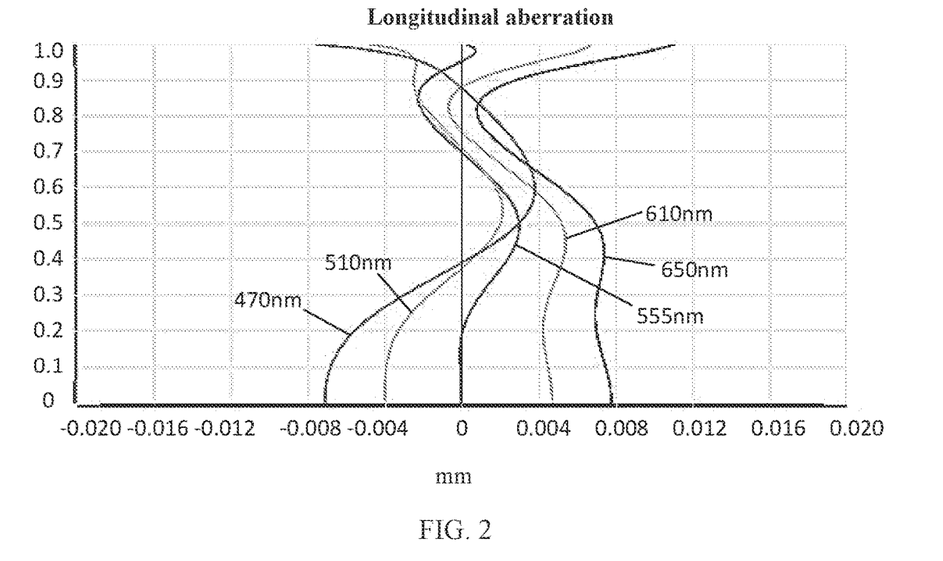
FIG. 2 is a schematic diagram of a longitudinal aberration of the camera optical lens shown in FIG. 1.
Figure 3:
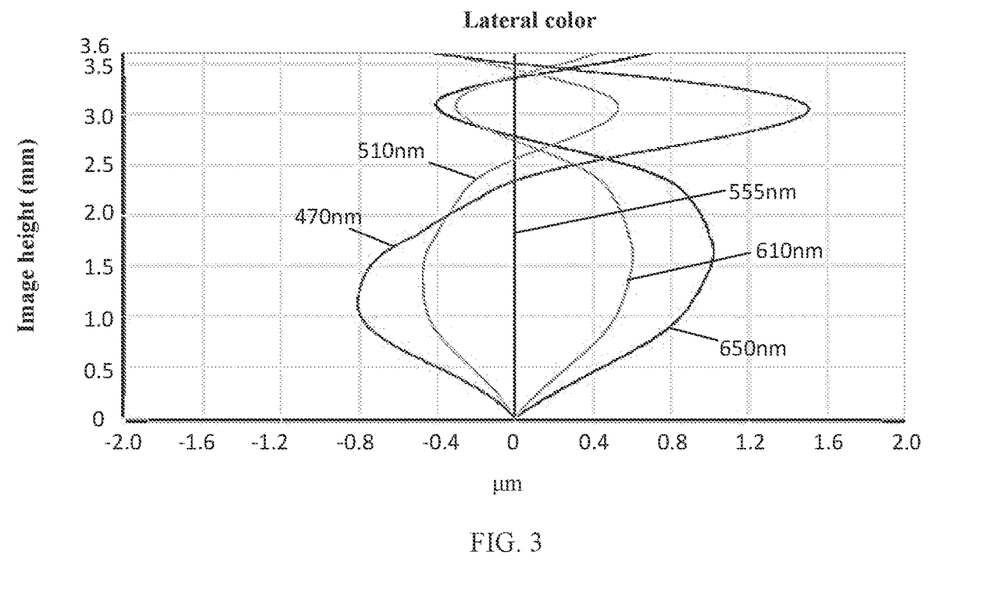
FIG. 3 is a schematic diagram of a lateral color of the camera optical lens shown in FIG. 1.
Figure 4:
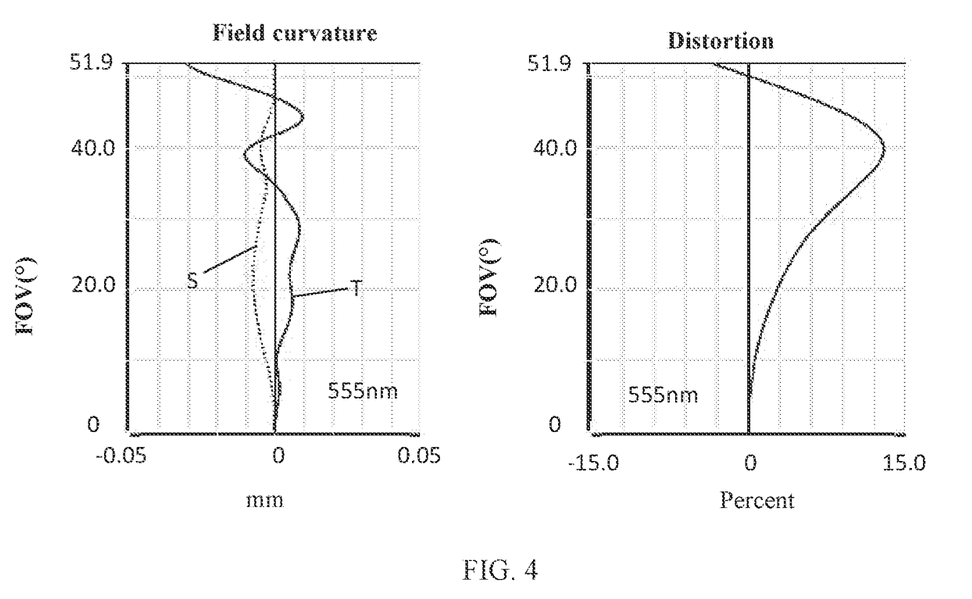
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 650 nm, 610 nm, 555 nm, 510 nm and 470 nm after passing the camera optical lens 10 according to Embodiment 1. FIG. 4 illustrates the field curvature and distortion of light with a wavelength of 555 nm after passing the camera optical lens 10 according to Embodiment 1, the field curvature S in FIG. 4 is a field curvature in the sagittal direction, T is a field curvature in a meridian direction.

In this embodiment, the entrance pupil diameter ENPD of the camera optical lens 10 is 1.357 mm, a full vision field image height IH is 3.600 mm, a field of view FOV in a diagonal direction is 103.80°, thus the camera optical lens 10 has a large aperture, a wide-angle and is ultra-thin. Its on-axis and off-axis chromatic aberrations are fully corrected, thereby achieving excellent optical characteristics.

Embodiment 2

Figure 5:
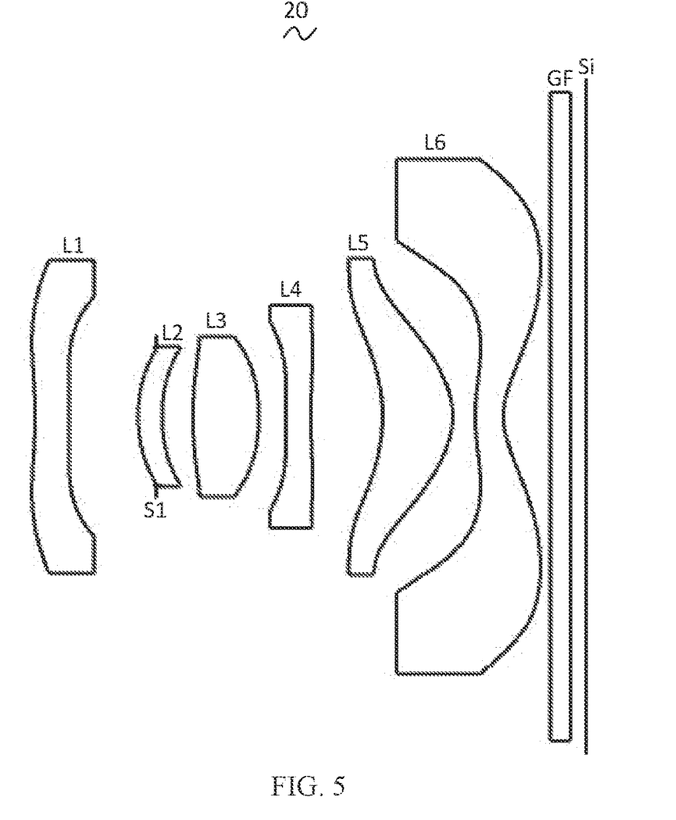
FIG. 5 is a schematic diagram of a structure of a camera optical lens in accordance with Embodiment 2 of the present disclosure.

FIG. 5 illustrates a camera optical lens 20 according to Embodiment 2 of the present disclosure. Embodiment 2 is basically the same as Embodiment 1 and involves symbols having the same meanings as Embodiment 1, and the description on the same parts therebetween will be omitted and only differences will be described in the following.

Table 5 and table 6 show design data of a camera optical lens 20 in Embodiment 2 of the present disclosure.

TABLE 5

| | R | | d | nd | | vd | |
|---|---|---|---|---|---|---|---|
| S1 | ∞ | d0= | −1.294 | | | | |
| R1 | −3.955 | d1= | 0.364 | nd1 | 1.6700 | v1 | 19.39 |
| R2 | −8.272 | d2= | 0.730 | | | | |
| R3 | 1.594 | d3= | 0.257 | nd2 | 1.6501 | v2 | 21.44 |
| R4 | 1.762 | d4= | 0.331 | | | | |
| R5 | 4.126 | d5= | 0.706 | nd3 | 1.5444 | v3 | 55.82 |
| R6 | −1.938 | d6= | 0.289 | | | | |
| R7 | 18.730 | d7= | 0.259 | nd4 | 1.6700 | v4 | 19.39 |
| R8 | 4.735 | d8= | 0.769 | | | | |
| R9 | −1.932 | d9= | 0.750 | nd5 | 1.5346 | v5 | 55.69 |
| R10 | −0.852 | d10= | 0.242 | | | | |
| R11 | 2.148 | d11= | 0.300 | nd6 | 1.6610 | v6 | 20.53 |
| R12 | 0.774 | d12= | 0.500 | | | | |
| R13 | ∞ | d13= | 0.210 | ndg | 1.5168 | vg | 64.17 |
| R14 | ∞ | d14= | 0.168 | | | | |

Table 6 shows aspherical surface data of each lens of the camera optical lens 20 in Embodiment 2 of the present disclosure.

TABLE 6

| | Conic Coefficient | Aspheric Surface Indexes | | | | |
|---|---|---|---|---|---|---|
| | k | A4 | A6 | A8 | A10 | A12 |
| R1 | 1.7382E+00 | 1.4559E−01 | −6.3671E−02 | 2.8021E−02 | −9.4846E−03 | 2.0877E−03 |
| R2 | 2.8265E+01 | 1.7707E−01 | −5.3552E−02 | 1.6339E−02 | 7.8331E−03 | −9.5114E−03 |
| R3 | 2.8256E−01 | 6.0313E−02 | −3.9893E−02 | 3.9372E−02 | −5.9066E−02 | −9.3573E−02 |
| R4 | 3.1922E+00 | 1.5637E−02 | −3.6604E−02 | −2.2277E−01 | 1.0494E+00 | −3.3260E+00 |
| R5 | 1.9699E+01 | −4.8347E−02 | −5.1270E−02 | −4.3857E−02 | 2.4573E−01 | −8.8943E−01 |
| R6 | 1.2541E+00 | −9.5765E−02 | 9.2951E−02 | −9.0276E−02 | −1.1997E−01 | 4.5857E−01 |
| R7 | 9.9846E+01 | −2.8762E−01 | 1.9250E−01 | −1.8929E−01 | 1.8445E−01 | −1.6040E−01 |
| R8 | −8.5416E+01 | −9.2648E−02 | 1.1327E−02 | 1.1425E−01 | −1.9979E−01 | 1.9073E−01 |
| R9 | −6.7094E+00 | −1.0851E−01 | 8.2901E−02 | −3.5736E−02 | 6.3883E−02 | −7.5849E−02 |
| R10 | −4.0045E+00 | −2.2602E−01 | 2.7001E−01 | −3.0108E−01 | 2.7502E−01 | −1.7150E−01 |
| R11 | −1.2975E+01 | −1.7010E−01 | 5.6778E−02 | 6.2218E−03 | −3.3308E−02 | 2.3770E−02 |
| R12 | −4.1502E+00 | −1.2671E−01 | 7.9966E−02 | −3.7824E−02 | 1.2425E−02 | −2.7809E−03 |

| | Conic Coefficient | Aspheric Surface Indexes | | | |
|---|---|---|---|---|---|
| | k | A14 | A16 | A18 | A20 |
| R1 | 1.7382E+00 | −2.6238E−04 | 1.4571E−05 | 0.0000E+00 | 0.0000E+00 |
| R2 | 2.8265E+01 | 3.3545E−03 | −3.0642E−04 | 0.0000E+00 | 0.0000E+00 |
| R3 | 2.8256E−01 | 2.1258E−01 | −2.0282E−01 | 0.0000E+00 | 0.0000E+00 |
| R4 | 3.1922E+00 | 4.7674E+00 | −3.1087E+00 | 0.0000E+00 | 0.0000E+00 |
| R5 | 1.9699E+01 | 1.2617E+00 | −6.7350E−01 | 0.0000E+00 | 0.0000E+00 |
| R6 | 1.2541E+00 | −5.4374E−01 | 2.4196E−01 | 0.0000E+00 | 0.0000E+00 |
| R7 | 9.9846E+01 | 1.1734E−01 | −3.6102E−02 | 4.8964E−04 | 0.0000E+00 |
| R8 | −8.5416E+01 | −1.0816E−01 | 3.5136E−02 | −5.0681E−03 | 0.0000E+00 |
| R9 | −6.7094E+00 | 4.6726E−02 | −1.6065E−02 | 2.9466E−03 | −2.2470E−04 |
| R10 | −4.0045E+00 | 7.0945E−02 | −1.8472E−02 | 2.7009E−03 | −1.6743E−04 |
| R11 | −1.2975E+01 | −8.8400E−03 | 1.7960E−03 | −1.6893E−04 | 4.0730E−06 |
| R12 | −4.1502E+00 | 4.1175E−04 | −3.8533E−05 | 2.0638E−06 | −4.8124E−08 |

Table 7 and table 8 show design data of inflexion points and arrest points of respective lens in the camera optical lens 20 according to Embodiment 2 of the present disclosure.

TABLE 7

|  | Number of inflexion points | Inflexion point position 1 | Inflexion point position 2 | Inflexion point position 3 |
|---|---|---|---|---|
| P1R1 | 1 | 0.435 | / | / |
| P1R2 | 1 | 0.255 | / | / |
| P2R1 | 0 | / | / | / |
| P2R2 | 0 | / | / | / |
| P3R1 | 0 | / | / | / |
| P3R2 | 0 | / | / | / |
| P4R1 | 2 | 0.135 | 0.995 | / |
| P4R2 | 2 | 0.355 | 0.985 | / |
| P5R1 | 1 | 0.895 | / | / |
| P5R2 | 1 | 1.075 | / | / |
| P6R1 | 3 | 0.405 | 1.775 | 1.885 |
| P6R2 | 1 | 0.565 | / | / |

TABLE 8

|  | Number of arrest points | Arrest point position 1 | Arrest point position 2 |
|---|---|---|---|
| P1R1 | 1 | 0.815 | / |
| P1R2 | 1 | 0.445 | / |
| P2R1 | 0 | / | / |
| P2R2 | 0 | / | / |
| P3R1 | 0 | / | / |
| P3R2 | 0 | / | / |
| P4R1 | 1 | 0.225 | / |
| P4R2 | 2 | 0.695 | 1.155 |
| P5R1 | 1 | 1.585 | / |
| P5R2 | 0 | / | / |
| P6R1 | 1 | 0.765 | / |
| P6R2 | 1 | 1.655 | / |

Figure 6:
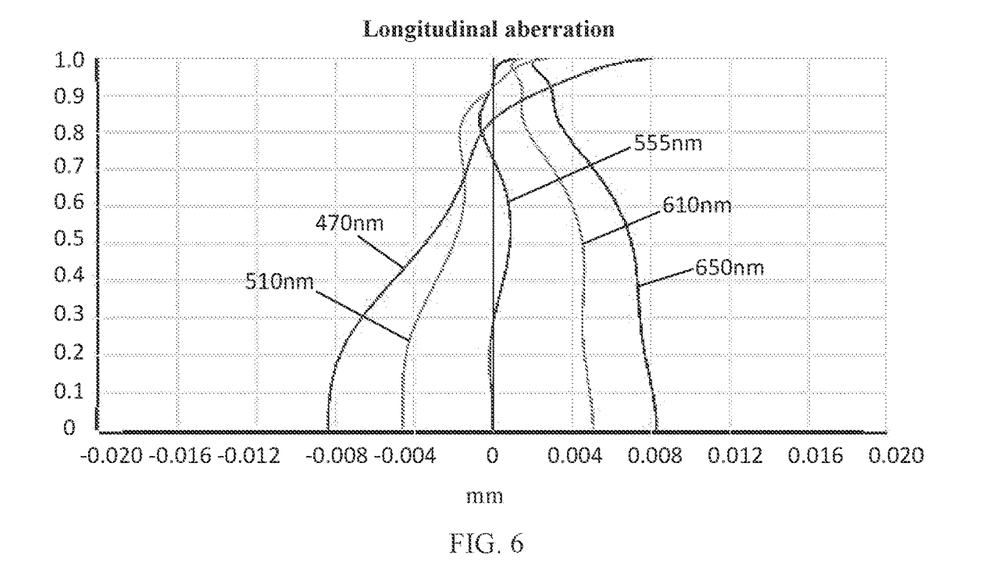
FIG. 6 is a schematic diagram of a longitudinal aberration of the camera optical lens shown in FIG. 5.
Figure 7:
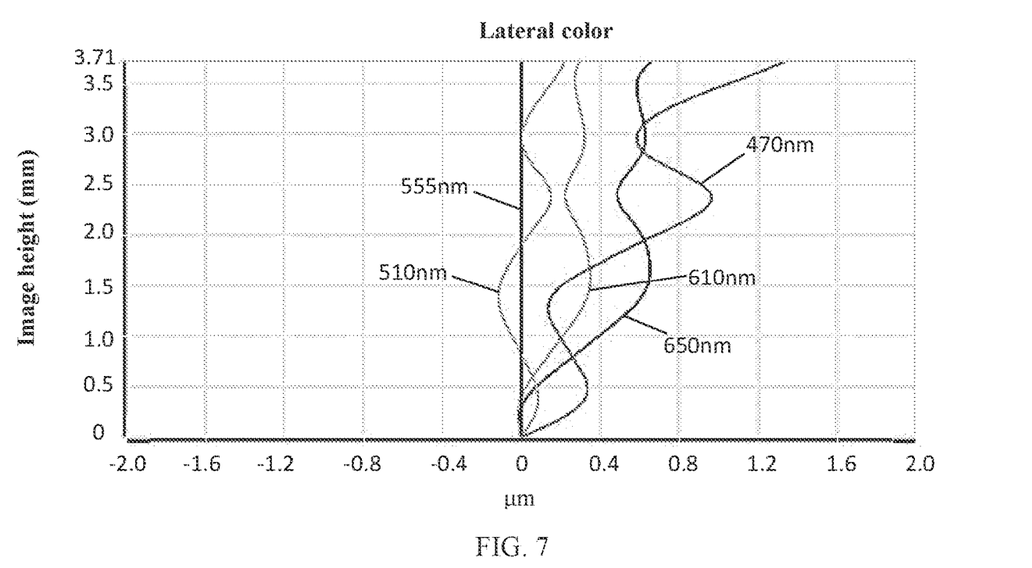
FIG. 7 is a schematic diagram of a lateral color of the camera optical lens shown in FIG. 5.
Figure 8:
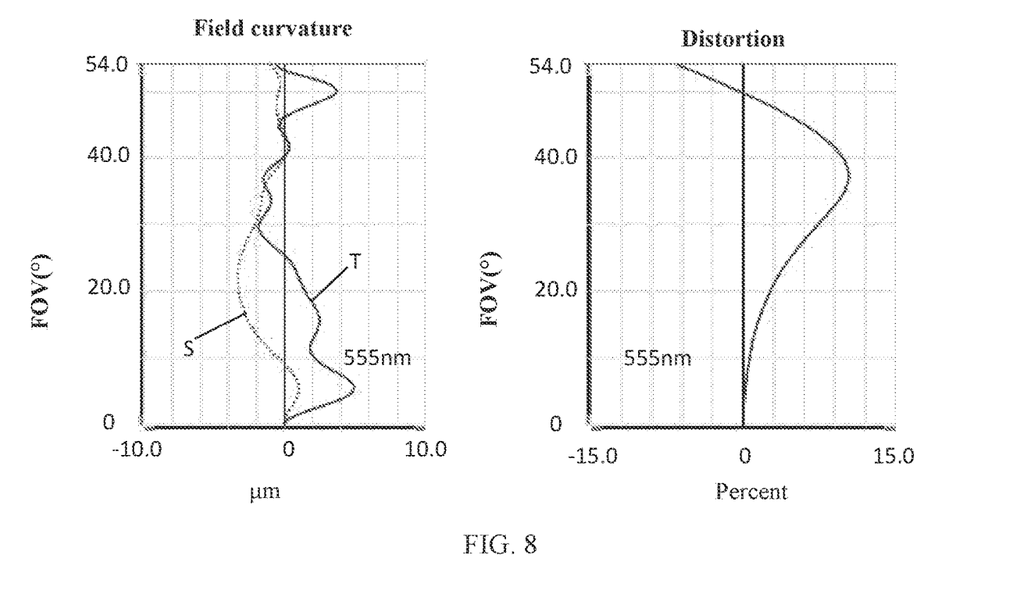
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm and 470 nm after passing the camera optical lens 20 according to Embodiment 2. FIG. 8 illustrates a field curvature and a distortion of light with a wavelength of 555 nm after passing the camera optical lens 20 according to Embodiment 2. The field curvature S in FIG. 8 is a field curvature in a sagittal direction, and T represents field curvature in meridian direction.

As shown in Table 17, the camera optical lens 20 according to this embodiment satisfies the above conditions.

In this embodiment, the entrance pupil diameter ENPD of the camera optical lens 20 is 1.341 mm. The full vision field image height IH is 3.711 mm, the field of view FOV in the diagonal direction is 108.00°. Thus, the camera optical lens 20 has a wide-angle and is ultra-thin. Its on-axis and off-axis chromatic aberrations are fully corrected, thereby achieving excellent optical characteristics.

Embodiment 3

Figure 9:
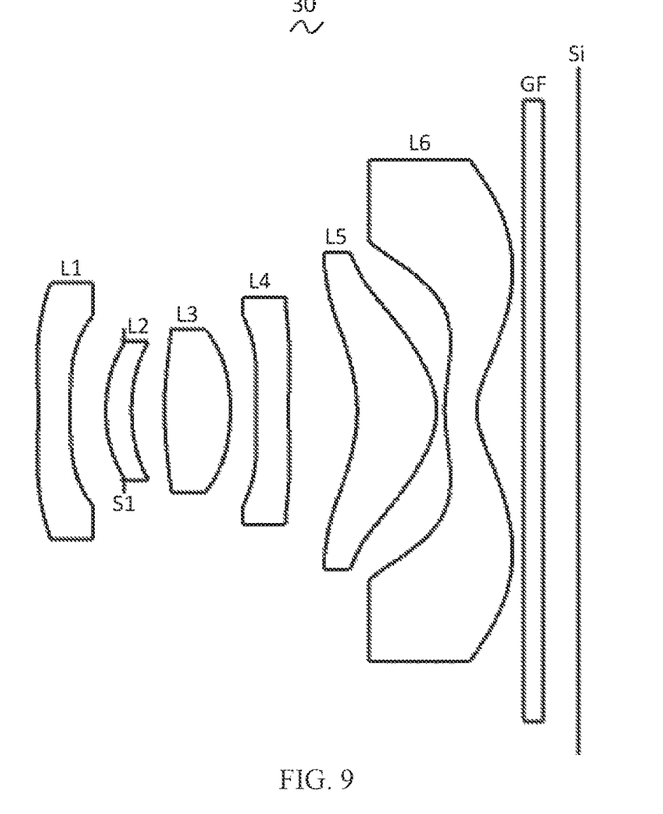
FIG. 9 is a schematic diagram of a structure of a camera optical lens in accordance with Embodiment 3 of the present disclosure.

FIG. 9 illustrates a camera optical lens 30 of Embodiment 3 of the present disclosure. Embodiment 3 is basically the same as Embodiment 1 and involves symbols having the same meanings as Embodiment 1, and the description on the same parts therebetween will be omitted and only differences will be described in the following.

In this embodiment, the image side surface of the first lens L1 is concave in the paraxial region.

Table 9 and Table 10 show design data of a camera optical lens 30 in Embodiment 3 of the present disclosure.

TABLE 9

|  | R | d |  | nd |  | vd |
|---|---|---|---|---|---|---|
| S1 | ∞ | d0= | −0.916 |  |  |  |
| R1 | −6.790 | d1= | 0.341 | nd1 | 1.6700 | v1 | 19.39 |
| R2 | 12.015 | d2= | 0.375 |  |  |  |
| R3 | 1.567 | d3= | 0.275 | nd2 | 1.6501 | v2 | 21.44 |
| R4 | 1.872 | d4= | 0.352 |  |  |  |
| R5 | 4.313 | d5= | 0.703 | nd3 | 1.5444 | v3 | 55.82 |
| R6 | −2.112 | d6= | 0.274 |  |  |  |
| R7 | 11.012 | d7= | 0.349 | nd4 | 1.6610 | v4 | 20.53 |
| R8 | 9.001 | d8= | 0.724 |  |  |  |
| R9 | −1.801 | d9= | 0.851 | nd5 | 1.5346 | v5 | 55.69 |
| R10 | −0.743 | d10= | 0.086 |  |  |  |
| R11 | 1.902 | d11= | 0.340 | nd6 | 1.6700 | v6 | 19.39 |
| R12 | 0.658 | d12= | 0.500 |  |  |  |
| R13 | ∞ | d13= | 0.210 | ndg | 1.5168 | vg | 64.17 |
| R14 | ∞ | d14= | 0.372 |  |  |  |

Table 10 shows aspherical surface data of each lens of the camera optical lens 30 in Embodiment 3 of the present disclosure.

TABLE 10

|  | Conic Coefficient | Aspheric Surface Indexes | | | | |
|---|---|---|---|---|---|---|
|  | k | A4 | A6 | A8 | A10 | A12 |
| R1 | 5.3847E+00 | 1.8157E−01 | −1.3104E−01 | 9.0179E−02 | −4.8428E−02 | 1.7393E−02 |
| R2 | 9.9545E+01 | 2.4238E−01 | −1.3534E−01 | 7.1340E−02 | 3.6960E−02 | −8.4212E−02 |
| R3 | 3.1134E−01 | 5.4069E−02 | −4.8923E−02 | 4.0761E−02 | 2.2066E−01 | −8.0325E−01 |
| R4 | 3.4799E+00 | −4.6633E−03 | −2.2715E−02 | −3.8483E−02 | 5.2168E−01 | −2.0049E+00 |
| R5 | 1.9952E+01 | −4.5519E−02 | −6.0431E−02 | 9.1289E−02 | −3.0458E−01 | 3.6792E−01 |
| R6 | 1.8073E+00 | −1.4014E−01 | 1.2346E−01 | −1.3414E−01 | 5.4232E−02 | 1.2434E−01 |
| R7 | 8.4539E+01 | −2.5034E−01 | 8.1797E−02 | −9.6128E−02 | 2.0365E−01 | −2.6179E−01 |
| R8 | −9.9900E+01 | −8.9885E−02 | 3.2491E−03 | 5.3424E−02 | −5.4313E−02 | 4.4047E−02 |
| R9 | −1.1189E+01 | −1.4840E−01 | 2.2534E−01 | −2.6164E−01 | 2.5926E−01 | −1.7744E−01 |
| R10 | −4.2549E+00 | −2.2928E−01 | 3.0576E−01 | −3.6847E−01 | 3.4013E−01 | −2.1738E−01 |
| R11 | −1.1226E+01 | −1.9416E−01 | 8.6681E−02 | −6.7867E−02 | 2.7680E−02 | 3.3317E−03 |
| R12 | −4.5125E+00 | −1.0046E−01 | 4.0802E−02 | −1.3075E−02 | 3.1614E−03 | −5.8737E−04 |
|  | Conic Coefficient | Aspheric Surface Indexes | | | | |
|  | k | A14 | A16 | A18 | A20 |  |
| R1 | 5.3847E+00 | −3.6940E−03 | 3.5476E−04 | 0.0000E+00 | 0.0000E+00 |  |
| R2 | 9.9545E+01 | 5.1054E−02 | −1.0363E−02 | 0.0000E+00 | 0.0000E+00 |  |
| R3 | 3.1134E−01 | 1.0682E+00 | −6.1738E−01 | 0.0000E+00 | 0.0000E+00 |  |

TABLE 10-continued

| | | | | |
|---|---|---|---|---|
| R4 | 3.4799E+00 | 3.0958E+00 | −2.1417E+00 | 0.0000E+00 | 0.0000E+00 |
| R5 | 1.9952E+01 | −1.8658E−01 | 2.1248E−02 | 0.0000E+00 | 0.0000E+00 |
| R6 | 1.8073E+00 | −2.3191E−01 | 1.2824E−01 | 0.0000E+00 | 0.0000E+00 |
| R7 | 8.4539E+01 | 1.8919E−01 | −4.8015E−02 | −3.5698E−03 | 0.0000E+00 |
| R8 | −9.9900E+01 | −3.1923E−02 | 1.5973E−02 | −3.3278E−03 | 0.0000E+00 |
| R9 | −1.1189E+01 | 7.8790E−02 | −2.1938E−02 | 3.4930E−03 | −2.4261E−04 |
| R10 | −4.2549E+00 | 9.3774E−02 | −2.5599E−02 | 3.9289E−03 | −2.5686E−04 |
| R11 | −1.1226E+01 | −9.3019E−03 | 4.1280E−03 | −7.6900E−04 | 5.2122E−05 |
| R12 | −4.5125E+00 | 7.9918E−05 | −7.2523E−06 | 3.8600E−07 | −9.0600E−09 |

Table 11 and table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point Position 3 |
|---|---|---|---|---|
| P1R1 | 1 | 0.285 | / | / |
| P1R2 | 0 | / | / | / |
| P2R1 | 0 | / | / | / |
| P2R2 | 0 | / | / | / |
| P3R1 | 0 | / | / | / |
| P3R2 | 0 | / | / | / |
| P4R1 | 2 | 0.185 | 0.985 | / |
| P4R2 | 2 | 0.305 | 1.015 | / |
| P5R1 | 2 | 0.885 | 1.505 | / |
| P5R2 | 2 | 1.135 | 1.615 | / |
| P6R1 | 3 | 0.395 | 1.635 | 1.775 |
| P6R2 | 2 | 0.535 | 2.595 | / |

TABLE 12

| | Number of arrest points | Arrest point position 1 | Arrest point position 2 |
|---|---|---|---|
| P1R1 | 1 | 0.515 | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 1 | 0.315 | / |
| P4R2 | 2 | 0.535 | 1.205 |
| P5R1 | 0 | / | / |
| P5R2 | 0 | / | / |
| P6R1 | 1 | 0.735 | / |
| P6R2 | 1 | 1.525 | / |

Figure 10:
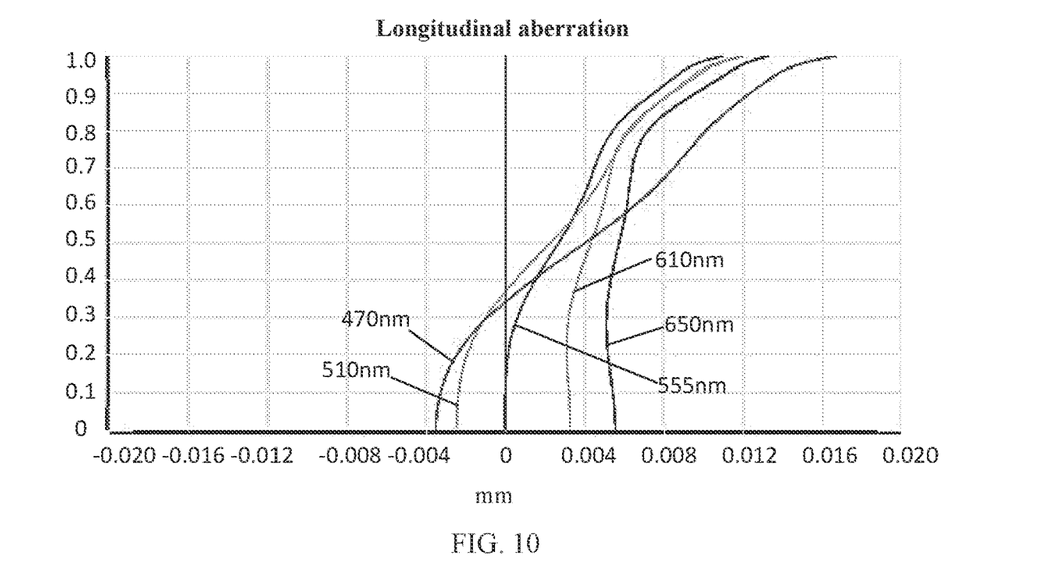
FIG. 10 is a schematic diagram of a longitudinal aberration of the camera optical lens shown in FIG. 9.
Figure 11:
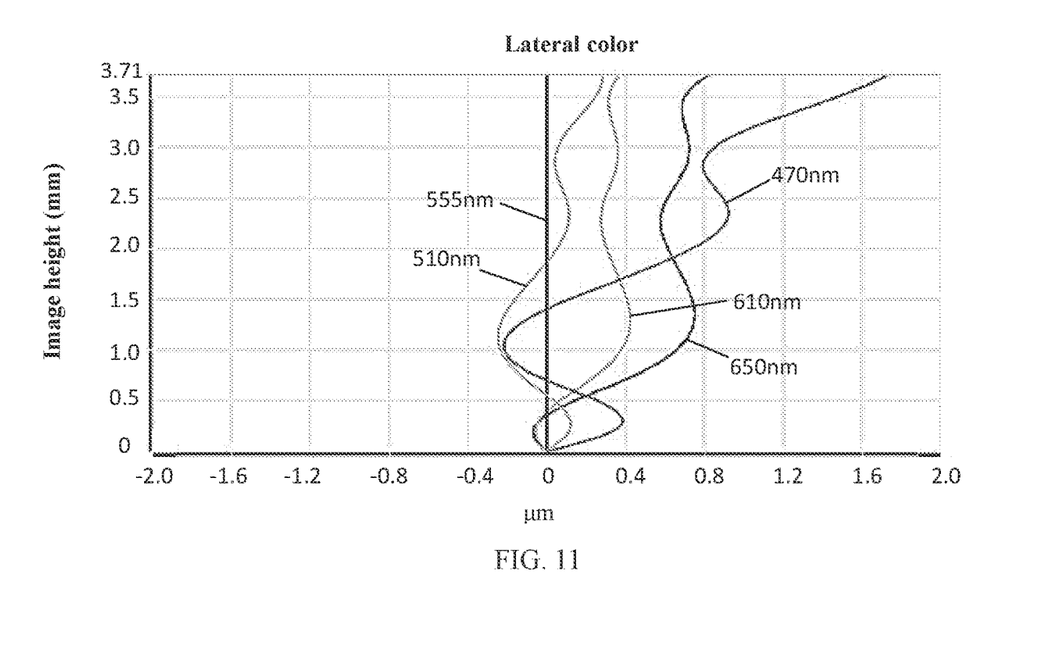
FIG. 11 is a schematic diagram of a lateral color of the camera optical lens shown in FIG. 9.
Figure 12:
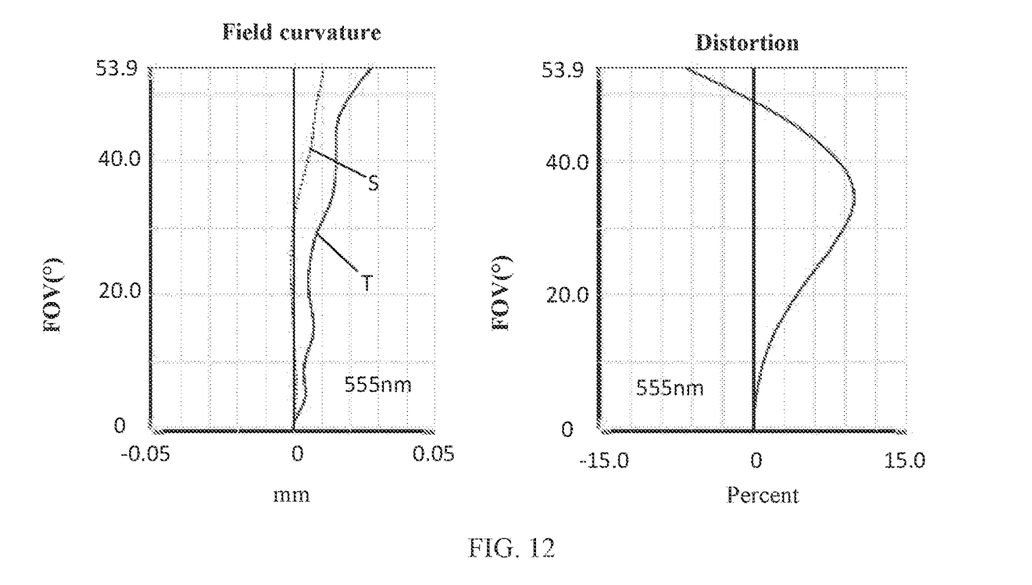
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm and 470 nm after passing the camera optical lens 30 according to Embodiment 3. FIG. 12 illustrates field curvature and distortion of light with a wavelength of 555 nm after passing the camera optical lens 30 according to Embodiment 3. The field curvature S in FIG. 12 is a field curvature in a sagittal direction, and T represents field curvature in meridian direction.

The following Table 17 shows that the camera optical lens 30 according to this embodiment satisfies the various conditions.

In this embodiment, a pupil entering diameter ENPD of the camera optical lens 30 is 1.346 mm, a full vision field image height is 3.711 mm, and a vision field angle in the diagonal direction is 107.80°. Thus, the camera optical lens 30 has a wide-angle and is ultra-thin. Its on-axis and off-axis chromatic aberrations are fully corrected, thereby achieving excellent optical characteristics.

Embodiment 4

Figure 13:
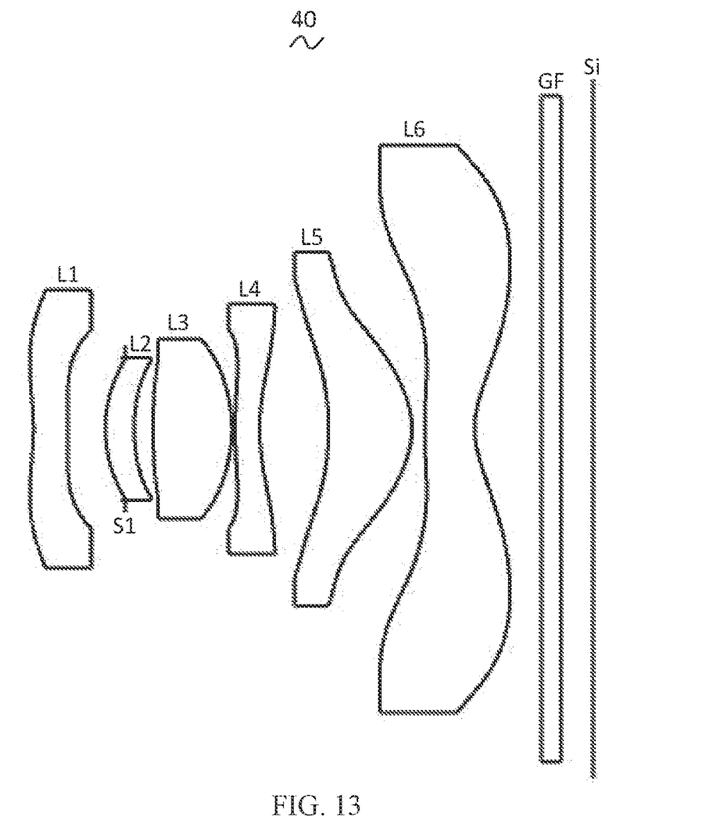
FIG. 13 is a schematic diagram of a structure of a camera optical lens in accordance with Embodiment 4 of the present disclosure.

FIG. 13 illustrates a camera optical lens 40 of Embodiment 4 of the present disclosure. Embodiment 4 is basically the same as Embodiment 1 and involves symbols having the same meanings as Embodiment 1, and the description on the same parts therebetween will be omitted and only differences will be described in the following.

Table 13 and Table 14 show design data of a camera optical lens 40 in Embodiment 4 of the present disclosure.

TABLE 13

| | R | d | | nd | | vd |
|---|---|---|---|---|---|---|
| S1 | ∞ | d0= | −0.959 | | | |
| R1 | −2.848 | d1= | 0.363 | nd1 | 1.5444 | v1 | 55.82 |
| R2 | −7.024 | d2= | 0.390 | | | |
| R3 | 1.570 | d3= | 0.300 | nd2 | 1.5444 | v2 | 55.82 |
| R4 | 1.851 | d4= | 0.197 | | | |
| R5 | 5.629 | d5= | 0.830 | nd3 | 1.5444 | v3 | 55.82 |
| R6 | −1.585 | d6= | 0.033 | | | |
| R7 | 4.031 | d7= | 0.260 | nd4 | 1.6700 | v4 | 19.39 |
| R8 | 1.945 | d8= | 0.718 | | | |
| R9 | −2.762 | d9= | 0.877 | nd5 | 1.5346 | v5 | 55.69 |
| R10 | −0.909 | d10= | 0.136 | | | |
| R11 | 4.802 | d11= | 0.524 | nd6 | 1.5661 | v6 | 37.71 |
| R12 | 0.905 | d12= | 0.696 | | | |
| R13 | ∞ | d13= | 0.210 | ndg | 1.5168 | vg | 64.17 |
| R14 | ∞ | d14= | 0.338 | | | |

Table 14 shows aspherical surface data of each lens of the camera optical lens 40 in Embodiment 4 of the present disclosure.

TABLE 14

| | Conic Coefficient | Aspheric Surface Indexes | | | | |
|---|---|---|---|---|---|---|
| | k | A4 | A6 | A8 | A10 | A12 |
| R1 | −2.5431E+00 | 2.8892E−01 | −2.7753E−01 | 2.8690E−01 | −2.6126E−01 | 1.8339E−01 |
| R2 | −3.9349E+02 | 2.6448E−01 | 1.5797E−01 | −1.2873E+00 | 4.0385E+00 | −7.8901E+00 |
| R3 | −4.9683E−01 | 1.7593E−01 | −3.9239E−01 | 1.4446E+00 | −5.1631E+00 | 1.5651E+01 |
| R4 | 4.1007E−01 | 1.2056E−01 | −2.4481E−01 | 1.3670E+00 | −6.1150E+00 | 2.0276E+01 |
| R5 | −3.9540E+01 | 6.1065E−02 | 6.7016E−02 | −6.6422E−01 | 2.7266E+00 | −7.5655E+00 |

TABLE 14-continued

| | | | | | | |
|---|---|---|---|---|---|---|
| R6 | 5.0346E−02 | 6.4426E−02 | −4.7212E−02 | −4.8076E−02 | −1.6674E−01 | 5.9126E−01 |
| R7 | 2.0931E+00 | −2.1453E−01 | 4.2202E−01 | −1.4202E+00 | 3.2996E+00 | −5.5997E+00 |
| R8 | −1.5682E+01 | −9.1863E−03 | −1.8733E−02 | 3.3493E−02 | −1.4039E−01 | 2.4843E−01 |
| R9 | −8.0104E−01 | −1.0230E−02 | −8.6328E−03 | −4.1437E−02 | 1.7424E−01 | −1.9718E−01 |
| R10 | −2.3033E+00 | 5.1619E−02 | −2.4200E−01 | 3.6039E−01 | −3.5579E−01 | 2.4727E−01 |
| R11 | −8.2417E+01 | −8.0110E−02 | −1.1457E−02 | 4.1603E−02 | −2.8074E−02 | 9.9965E−03 |
| R12 | −5.0442E+00 | −8.7709E−02 | 4.4370E−02 | −1.6868E−02 | 4.5122E−03 | −8.4444E−04 |

| | Conic Coefficient | Aspheric Surface Indexes | | | |
|---|---|---|---|---|---|
| | k | A14 | A16 | A18 | A20 |
| R1 | −2.5431E+00 | −9.0566E−02 | 2.8836E−02 | −5.2463E−03 | 4.0989E−04 |
| R2 | −3.9349E+02 | 1.0041E+01 | −8.0215E+00 | 3.6448E+00 | −7.1697E−01 |
| R3 | −4.9683E−01 | −3.5704E+01 | 5.4109E+01 | −4.6975E+01 | 1.7313E+01 |
| R4 | 4.1007E−01 | −4.2262E+01 | 4.8879E+01 | −2.4097E+01 | 3.9077E−01 |
| R5 | −3.9540E+01 | 1.3925E+01 | −1.5008E+01 | 7.3533E+00 | −4.4474E−01 |
| R6 | 5.0346E−02 | −5.8716E−01 | 2.5748E−01 | −1.8595E−01 | 1.1167E−01 |
| R7 | 2.0931E+00 | 6.6527E+00 | −5.1606E+00 | 2.3351E+00 | −4.7343E−01 |
| R8 | −1.5682E+01 | −2.1976E−01 | 1.0670E−01 | −2.7644E−02 | 3.0380E−03 |
| R9 | −8.0104E−01 | 1.1361E−01 | −3.7556E−02 | 6.8373E−03 | −5.3105E−04 |
| R10 | −2.3033E+00 | −1.0891E−01 | 2.8330E−02 | −3.9702E−03 | 2.3156E−04 |
| R11 | −8.2417E+01 | −2.0762E−03 | 2.5253E−04 | −1.6718E−05 | 4.6624E−07 |
| R12 | −5.0442E+00 | 1.0750E−04 | −8.8444E−06 | 4.2231E−07 | −8.8210E−09 |

Table 15 and table 16 show design data of inflexion points and arrest points of respective lens in the camera optical lens 40 according to Embodiment 4 of the present disclosure.

TABLE 15

| | Number of inflexion points | Inflexion point position 1 | Inflexion point position 2 | Inflexion point Position 3 |
|---|---|---|---|---|
| P1R1 | 2 | 0.365 | 1.425 | / |
| P1R2 | 2 | 0.185 | 1.085 | / |
| P2R1 | 0 | / | / | / |
| P2R2 | 0 | / | / | / |
| P3R1 | 0 | / | / | / |
| P3R2 | 0 | / | / | / |
| P4R1 | 1 | 0.385 | / | / |
| P4R2 | 2 | 0.635 | 1.335 | / |
| P5R1 | 3 | 0.935 | 1.285 | 1.495 |
| P5R2 | 3 | 1.065 | 1.705 | 1.835 |
| P6R1 | 2 | 0.355 | 1.765 | / |
| P6R2 | 2 | 0.605 | 2.895 | / |

TABLE 16

| | Number of arrest points | Arrest point position 1 | Arrest point position 2 |
|---|---|---|---|
| P1R1 | 1 | 0.705 | / |
| P1R2 | 1 | 0.315 | / |
| P2R1 | 0 | / | / |
| P2R2 | 0 | / | / |
| P3R1 | 0 | / | / |
| P3R2 | 0 | / | / |
| P4R1 | 1 | 0.665 | / |
| P4R2 | 0 | / | / |
| P5R1 | 0 | / | / |
| P5R2 | 1 | 1.925 | / |
| P6R1 | 2 | 0.655 | 2.615 |
| P6R2 | 1 | 1.745 | / |

Figure 14:
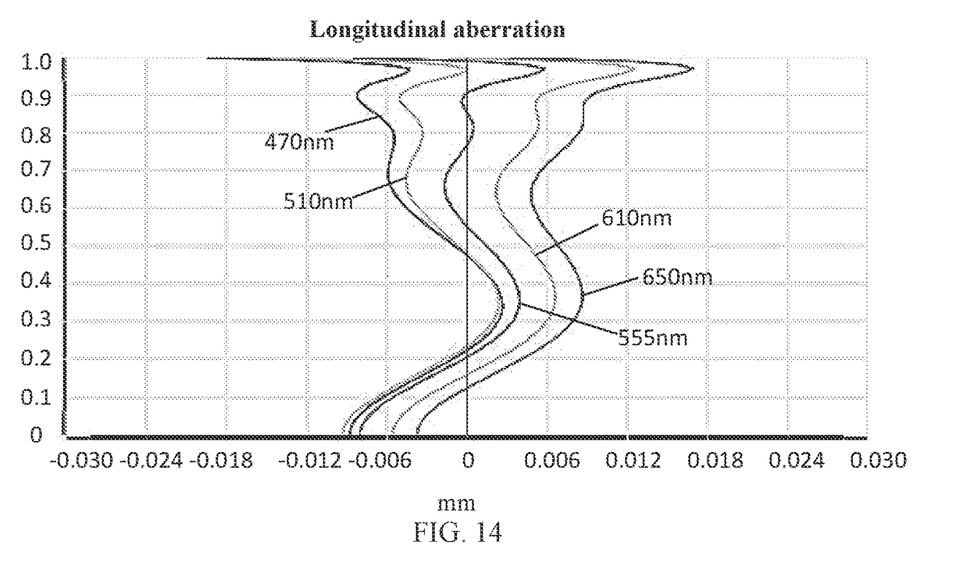
FIG. 14 is a schematic diagram of a longitudinal aberration of the camera optical lens shown in FIG. 13.
Figure 15:
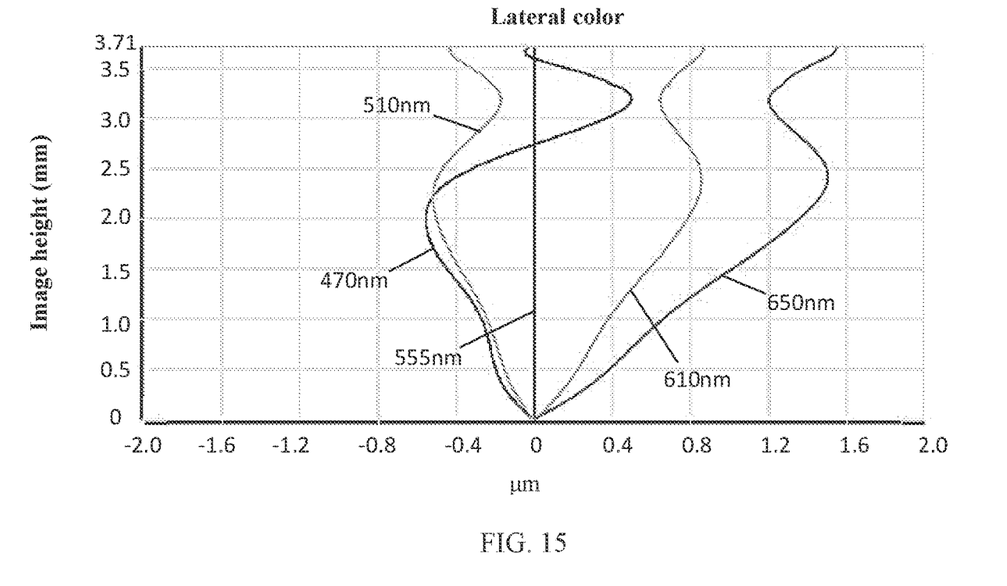
FIG. 15 is a schematic diagram of a lateral color of the camera optical lens shown in FIG. 13.
Figure 16:
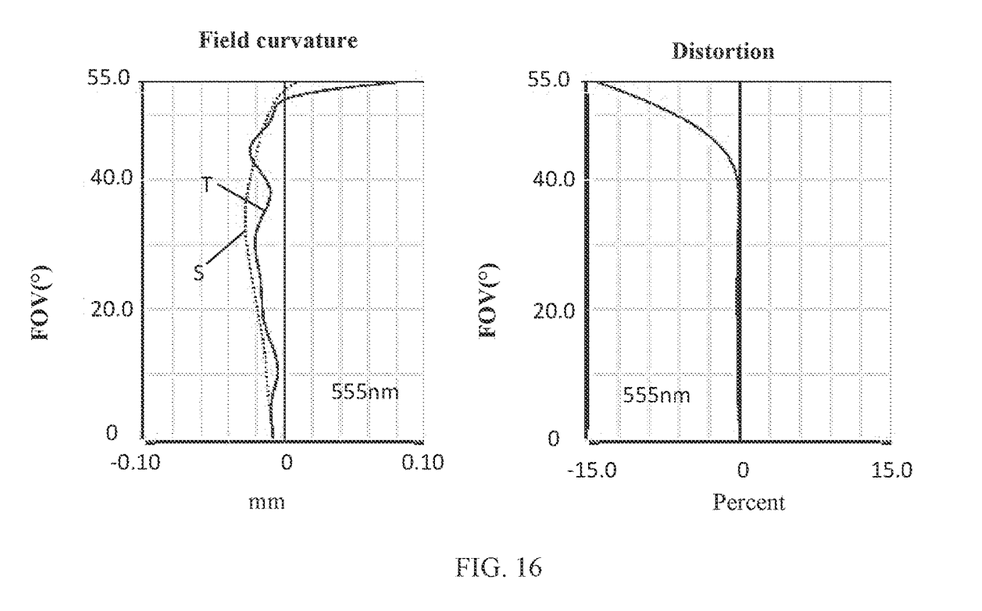
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 650 nm, 610 nm, 555 nm, 510 nm and 470 nm after passing the camera optical lens 40 according to Embodiment 4. FIG. 16 illustrates field curvature and distortion of light with a wavelength of 555 nm after passing the camera optical lens 40 according to Embodiment 4. The field curvature S in FIG. 16 is a field curvature in a sagittal direction, and T represents field curvature in meridian direction.

The following Table 17 shows that the camera optical lens 40 according to this embodiment satisfies the various conditions.

In this embodiment, a pupil entering diameter ENPD of the camera optical lens 40 is 1.347 mm, a full vision field image height is 3.711 mm, and a vision field angle in the diagonal direction is 110.00°. Thus, the camera optical lens 40 has a wide-angle and is ultra-thin. Its on-axis and off-axis chromatic aberrations are fully corrected, thereby achieving excellent optical characteristics.

TABLE 17

| Parameters and conditions | Embodiment 1 | Embodiment 2 | Embodiment 3 | Embodiment 4 |
|---|---|---|---|---|
| f1/f | −4.50 | −4.02 | −2.20 | −3.00 |
| f2/f | 2.05 | 5.49 | 3.74 | 4.56 |
| (R3 + R4)/(R3 − R4) | −2.51 | −19.98 | −11.28 | −12.17 |
| d9/d10 | 9.88 | 3.10 | 9.90 | 6.45 |
| f | 2.918 | 2.883 | 2.892 | 3.018 |
| f1 | −13.127 | −11.603 | −6.363 | −9.048 |
| f2 | 5.982 | 15.831 | 10.829 | 13.762 |
| f3 | 3.123 | 2.518 | 2.700 | 2.360 |
| f4 | −9.175 | −9.441 | −79.410 | −5.853 |
| f5 | 1.601 | 2.288 | 1.842 | 2.167 |
| f6 | −1.338 | −1.988 | −1.674 | −2.060 |
| f12 | 9.333 | −46.111 | −15.045 | −26.469 |
| FNO | 2.15 | 2.15 | 2.15 | 2.24 |
| TTL | 5.973 | 5.875 | 5.752 | 5.872 |
| FOV | 103.80° | 108.00° | 107.80° | 110.00° |
| IH | 3.600 | 3.711 | 3.711 | 3.711 |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising six lenses in total, the six lenses are, from an object side to an image side in sequence:

a first lens having a negative refractive power;
a second lens having a positive refractive power;
a third lens having a positive refractive power;
a fourth lens having a negative refractive power;
a fifth lens having a positive refractive power; and
a sixth lens having a negative refractive power;
wherein, the camera optical lens satisfies the following conditions:
$-4.50 \leq f1/f \leq -2.20$;
$2.00 \leq f2/f \leq 5.50$;
$-20.00 \leq (R3+R4)/(R3-R4) \leq -2.50$;
$1.50 \leq (R7+R8)/(R7-R8) \leq 10.00$; and
$3.00 \leq d9/d10 \leq 10.00$;
where,
f denotes a focus length of the camera optical lens;
f1 denotes a focus length of the first lens;
f2 denotes a focus length of the second lens;
d9 denotes an on-axis thickness of the fifth lens;
d10 denotes an on-axis distance from an image side surface of the fifth lens to an object side surface of the sixth lens;
R3 denotes a central curvature radius of an object side surface of the second lens;
R4 denotes a central curvature radius of an image side surface of the second lens,
R7 denotes a central curvature radius of an object side surface of the fourth lens; and
R8 denotes a central curvature radius of an image side surface of the fourth lens.

2. The camera optical lens according to claim 1, wherein, the camera optical lens further satisfies the following conditions:
$-5.66 \leq (R1+R2)/(R1-R2) \leq -0.19$; and
$0.03 \leq d1/TTL \leq 0.14$;
where,
R1 denotes a central curvature radius of an object side surface of the first lens;
R2 denotes a central curvature radius of an image side surface of the first lens;
d1 denotes an on-axis thickness of the first lens; and
TTL denotes a total optical length from the object side surface of the first lens to an image surface of the camera optical lens along an optical axis.

3. The camera optical lens according to claim 1, wherein, the camera optical lens further satisfies the following conditions:
$0.02 \leq d3/TTL \leq 0.08$;
where,
d3 denotes an on-axis thickness of the second lens; and
TTL denotes a total optical length from an object side surface of the first lens to an image surface of the camera optical lens along an optical axis.

4. The camera optical lens according to claim 1, wherein, the camera optical lens further satisfies the following conditions:
$0.39 \leq f3/f \leq 1.61$;
$0.17 \leq (R5+R6)/(R5-R6) \leq 0.98$; and
$0.06 \leq d5/TTL \leq 0.21$;
where,
f3 denotes a focus length of the third lens;
R5 denotes a central curvature radius of an object side surface of the third lens;
R6 denotes a central curvature radius of an image side surface of the third lens;

d5 denotes an on-axis thickness of the third lens; and
TTL denotes a total optical length from an object side surface of the first lens to an image surface of the camera optical lens along an optical axis.

5. The camera optical lens according to claim 1, wherein, the camera optical lens further satisfies the following conditions:
$-54.92 \leq f4/f \leq -1.29$; and
$0.02 \leq d7/TTL \leq 0.09$;
where,
f4 denotes a focus length of the fourth lens;
d7 denotes an on-axis thickness of the fourth lens; and
TTL denotes a total optical length from an object side surface of the first lens to an image surface of the camera optical lens along an optical axis.

6. The camera optical lens according to claim 1, wherein, the camera optical lens further satisfies the following conditions:
$0.27 \leq f5/f \leq 1.19$;
$0.97 \leq (R9+R10)/(R9-R10) \leq 3.87$; and
$0.06 \leq d9/TTL \leq 0.22$;
where,
f5 denotes a focus length of the fifth lens;
R9 denotes a central curvature radius of an object side surface of the fifth lens;
R10 denotes a central curvature radius of the image side surface of the fifth lens; and
TTL denotes a total optical length from an object side surface of the first lens to an image surface of the camera optical lens along an optical axis.

7. The camera optical lens according to claim 1, wherein, the camera optical lens further satisfies the following conditions:
$-1.38 \leq f6/f \leq -0.31$;
$0.55 \leq (R11+R12)/(R11-R12) \leq -3.19$; and
$0.03 \leq d11/TTL \leq 0.13$;
where,
f6 denotes a focus length of the sixth lens;
R11 denotes a central curvature radius of the object side surface of the sixth lens;
R12 denotes a central curvature radius of an image side surface of the sixth lens;
d11 denotes an on-axis thickness of the sixth lens; and
TTL denotes a total optical length from an object side surface of the first lens to an image surface of the camera optical lens along an optical axis.

8. The camera optical lens according to claim 1 wherein the camera optical lens further satisfies the following conditions:
$TTL/IH \leq 1.66$;
where,
IH denotes an image height of the camera optical lens; and
TTL denotes a total optical length from an object side surface of the first lens to an image surface of the camera optical lens along an optical axis.

9. The camera optical lens according to claim 1, wherein the camera optical lens further satisfies the following conditions:
$FOV \leq 103°$;
where,
FOV denotes a field of view of the camera optical lens.

* * * * *